US007599857B2

(12) United States Patent
Bishop et al.

(10) Patent No.: US 7,599,857 B2
(45) Date of Patent: Oct. 6, 2009

(54) SYSTEM AND METHOD FOR FACILITATING INTERACTION BETWEEN CONSUMER AND MERCHANT

(75) Inventors: Fred Bishop, Glendale, AZ (US); Elliott Glazer, Chesterfield, VA (US); Soleil Kathleen Dolce, New River, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 308 days.

(21) Appl. No.: 10/707,309

(22) Filed: Dec. 4, 2003

(65) Prior Publication Data

US 2004/0172340 A1    Sep. 2, 2004

Related U.S. Application Data

(63) Continuation-in-part of application No. 10/299,891, filed on Nov. 19, 2002, now abandoned.

(51) Int. Cl.
G06Q 30/00    (2006.01)
G07G 1/00    (2006.01)
(52) U.S. Cl. .......................................... 705/26; 705/14
(58) Field of Classification Search ................... 705/26, 705/27, 14
See application file for complete search history.

(56) References Cited

U.S. PATENT DOCUMENTS

| 5,353,218 | A | | 10/1994 | DeLapa et al. | |
|---|---|---|---|---|---|
| 5,845,260 | A | * | 12/1998 | Nakano et al. | 705/26 |
| 5,933,811 | A | * | 8/1999 | Angles et al. | 705/14 |
| 5,953,710 | A | * | 9/1999 | Fleming | 705/38 |
| 5,960,411 | A | * | 9/1999 | Hartman et al. | 705/26 |
| 6,317,718 | B1 | * | 11/2001 | Fano | 705/1 |
| 6,385,592 | B1 | * | 5/2002 | Angles et al. | 705/14 |
| 7,096,204 | B1 | * | 8/2006 | Chen et al. | 705/74 |

(Continued)

FOREIGN PATENT DOCUMENTS

| WO | WO 97/20279 A1 | 6/1997 |
|---|---|---|
| WO | WO 9720279 A1 * | 6/1997 |

OTHER PUBLICATIONS

Unknown author, "Orbitz Makes Booking Vacation Packages Easier With Customized Search Options And On-Click Availability And Pricing," PR Newswire, New York, Oct. 3, 2002, p. 1.*

(Continued)

Primary Examiner—Jeffrey A Smith
Assistant Examiner—Amee A Shah
(74) Attorney, Agent, or Firm—Fitzpatrick, Cella, Harper & Scinto

(57) ABSTRACT

An automated method and system is provided for facilitating interaction between a consumer and a merchant using a strong security framework. An offer describing a product and a predetermined means for acceptance is presented via a display. Once the offer has been presented, if the consumer accepts, the system performs various authentications, then facilitates receipt of the acceptance. The system then combines the acceptance data with identification and payment information, and transmits the relevant information to the merchant. Optionally, the system may customize the content or the presentation of the offer based on information about the targeted consumer.

20 Claims, 2 Drawing Sheets

U.S. PATENT DOCUMENTS

| | | | |
|---|---|---|---|
| 2002/0004748 A1* | 1/2002 | Koga et al. | 705/14 |
| 2002/0120519 A1* | 8/2002 | Martin et al. | 705/21 |
| 2002/0128977 A1* | 9/2002 | Nambiar et al. | 705/64 |
| 2002/0147638 A1* | 10/2002 | Banerjee et al. | 705/14 |
| 2002/0147642 A1* | 10/2002 | Avallone et al. | 705/14 |
| 2002/0147669 A1* | 10/2002 | Taylor et al. | 705/35 |
| 2002/0156688 A1* | 10/2002 | Horn et al. | 705/26 |
| 2002/0169664 A1* | 11/2002 | Walker et al. | 705/26 |
| 2003/0144913 A1* | 7/2003 | Greenberg | 705/26 |
| 2004/0093303 A1* | 5/2004 | Picciallo | 705/39 |
| 2007/0061204 A1* | 3/2007 | Ellis et al. | 705/14 |

OTHER PUBLICATIONS

Unknown author, "BizRate.com Unwraps New Site Features In Time For Holiday 2001: BizRate.com Offers Holiday Hints For Finding The Right Gift At The Right Price," Business Wire, New York, Nov. 15, 2001, p. 1.*

International Search Report dated Dec. 27, 2004.

* cited by examiner

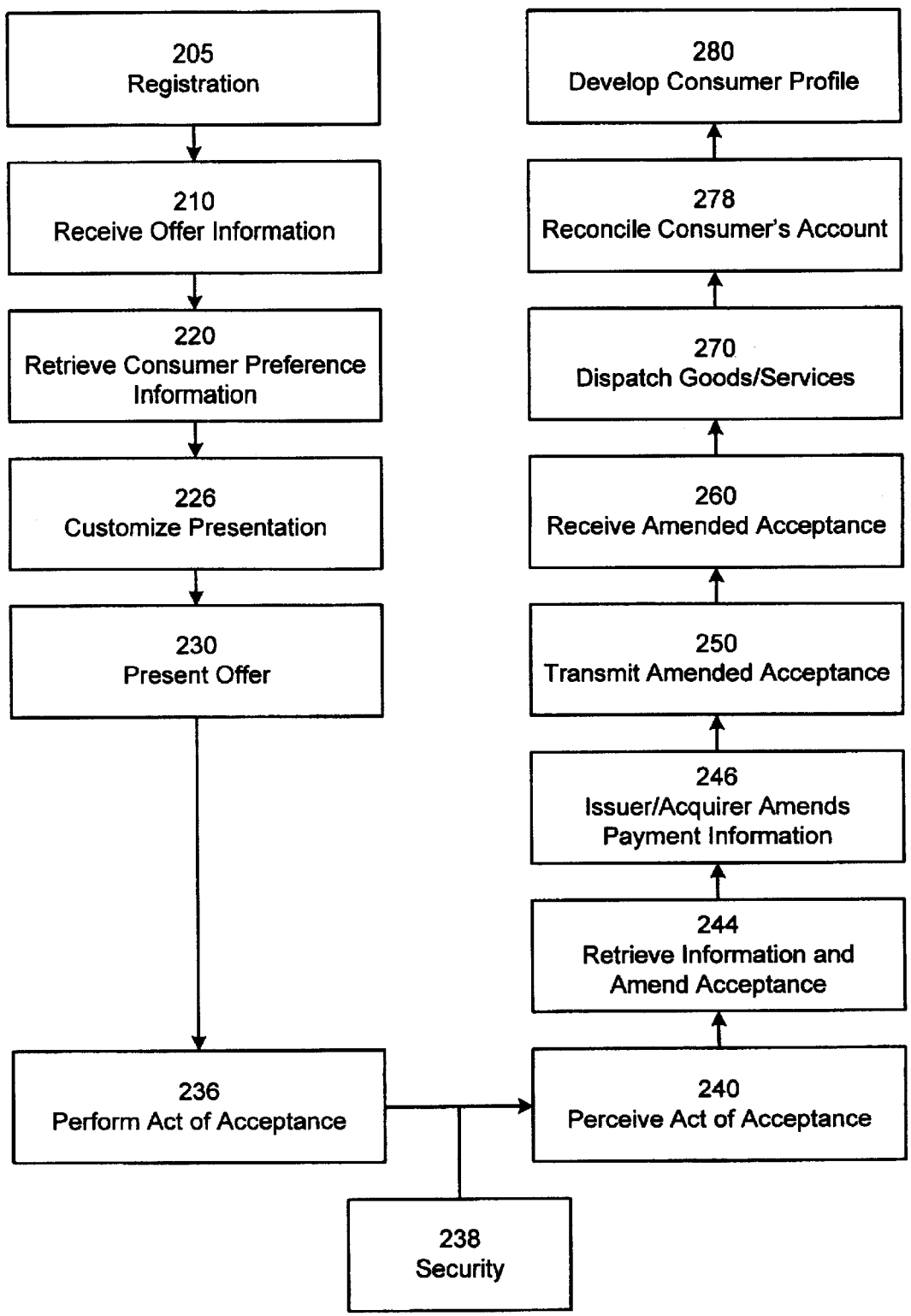

SYSTEM AND METHOD FOR FACILITATING INTERACTION BETWEEN CONSUMER AND MERCHANT

CROSS REFERENCE TO RELATED APPLICATIONS

This application is a continuation-in-part of, and claims priority to, U.S. Utility Patent Application entitled "System And Method For Facilitating Interaction Between Consumer And Merchant", Ser. No. 10/299,891 filed on Oct. 19, 2002, the entire contents of which is hereby incorporated by reference.

FIELD OF INVENTION

This invention relates generally to an interactive marketing system and method, and more specifically to a method and system for facilitating interaction between consumer and merchant via an interactive display in association with a strong security framework.

BACKGROUND OF INVENTION

For many years, merchants have used advertising to entice consumers to purchase goods and services. For example, merchants have traditionally appealed to consumers by presenting offers and advertisements on billboards, in magazines and newspapers, through direct mailings and telephone solicitations, and even using signs on the sides of buses. Merchants have also presented advertisements through broadcast media such as radio and television, and more recently via the internet and web broadcasts.

Regardless of the medium through which merchants present their messages, however, those messages typically attempt to create or grow, in a consumer, a desire for a particular product or service. Accordingly, in addition to consumers who may already be seeking the relevant goods or services, merchants use advertisements to reach consumers who may not be actively seeking the information presented in the advertisement and who may have been engaged in activities (e.g., watching television, driving or riding in a car) completely unrelated to a quest for the advertised goods or services.

Typically, such advertisements require a consumer to act in some way before a transaction for the advertised good or services can be completed. For example, regardless where a consumer may see or hear a particular advertisement, the consumer has historically been required to either travel to a point of purchase or dispatch a communication (e.g., place a phone call, mail an order) to the merchant before a bargain for the advertised goods or services may be struck between the merchant and the consumer. Unfortunately for the merchant, however, the more complicated or onerous the required act or the more time that lapses between the consumer's receipt of the advertisement and the performance of the required act, the less likely that consumer is to complete the act. Conversely, the simpler and quicker the required act, the more likely a transaction is to be completed. Therefore, it is desirable to enable consumers to respond to advertisements and offers with minimal time and effort, and as expeditiously as possible after perceiving a particular advertisement. Based on this principle, merchants may place impulse items, such as gum and the like, near a grocery store checkout counter or may suggest the purchase of french fries following a consumer's order of a hamburger.

Yet, while such approaches may be effective where a consumer is already engaged in a transaction with the merchant, significant obstacles remain in situations where transactional activity is not already in progress. For example, where an advertisement is presented to a consumer via a television, and where the advertisement indicates that acceptance of the offer may be performed by placing a telephone call, the consumer must then place the telephone call and present some form of payment such as credit card, debit card or checking account information and must also provide identifying information, e.g., a shipping address. In many cases, these tasks are sufficiently onerous and time consuming to dissuade a consumer from responding to the advertisement.

At the same time, it is well understood that the needs and wants of individual viewers within a viewing audience may vary greatly. Yet, advertisements that are adapted to be presented via traditional means, such as via television or radio broadcast, are typically presented without any consideration or adjustment for variations within the viewing audience. This is largely due to the fact that no satisfactory mechanism currently exists for adjusting a presentation based on real-time feedback from a consumered consumer. In addition, advertisements for presentation via television broadcast are typically prepared well in advance of their broadcast. Accordingly, such advertisements are designed to consumer the largest portion of the viewing audience and are typically fixed, being incapable of modification in response to feedback from one or more viewer. Thus, the content of such advertisements may not hold any significant appeal for significant portions of the consumer audience. Further, the non-targeted portions of the audience are typically those falling outside the mainstream.

With the advent of the internet, consumers and merchants have been able to partially address the above-mentioned drawbacks of traditional advertising mechanisms. For example, merchants are now able to provide substantial amounts of information on web sites, thereby allowing consumers with very specific needs to find advertisements that suit their particularized needs. Moreover, once internet-equipped consumers have surfed to the advertisement presenting the desired good or service, their purchase is often made very simple and quick through the use of stored information and one-click purchase features.

Yet, even these systems do not completely solve the above-described problems because they typically require the consumer to have actively sought the desired goods or services. Accordingly, currently available internet capabilities may not be effective on attracting viewers who are not already seeking the advertised goods or services. Therefore, they may not be at all effective in persuading consumers who may be engaged in passive activities, such as watching television or web broadcasts. Moreover, consumers have become increasing concerned about security issues related to transmitting an account number (e.g., associated with a transaction card) over the internet or providing the account number to a customer service representative. Additionally, parents have become increasingly concerned about minors accessing certain web pages or purchasing certain items over the internet or over the phone.

Accordingly, a need existed for a system and method for facilitating communication between a merchant and a consumer whereby a consumer engaged in a passive activity may be persuaded to seek a particular good or service and whereby the consumer may acquire such good or service from the merchant over a substantially secure framework with a minimum investment of time and effort, e.g., in an instantaneous and effortless manner. A further need existed for a system and method whereby advertisements may be adapted based on feedback provided by a particular consumer or in response to information concerning the consumer that may be stored in the facilitating system. A still further need existed for a system and method that facilitates storage of information regarding the consumer and the consumer's desired payment method whereby such information may be communicated to a merchant to facilitate the consumer's response to an advertisement.

SUMMARY OF INVENTION

The invention facilitates interaction between a consumer and a merchant by, for example, registering the consumer, receiving offer information from the merchant, wherein the offer information relates to a product, customizing the offer information with consumer preference information to create an amended offer, transmitting the amended offer to a display for viewing by the consumer, receiving an acceptance from the consumer, wherein the acceptance is associated with the amended offer and the acceptance includes a security feature, amending the acceptance with consumer payment information and identification information to create an amended acceptance, and transmitting the amended acceptance to the merchant. In addition to the interface device, the system may include an offer retrieval engine, offer storage database, maintenance engine, amended offer engine, broadcast device, billing engine, authentication module, event tracker and/or offer evaluation device.

The method may also include transmitting via television programming or web broadcast. The consumer may accept the offer via a remote control, electronic pen, telephone, automatic dialing device, microphone, pager, radio frequency device, personal digital assistant, smart card, DVR, PVR, or simulated button. The security feature of the acceptance may include authentication, embedded certificates, consumer ID and password, identifier, data encryption, digital signature, secure file structures, or trusted third party downloads. Other security features include authenticating and authorizing a transaction. The system may also include authenticating the consumer, restricting access to certain portions of the method, managing consumer identities, or analyzing attributes of the consumer to substantially predict offer content and context. When amending the acceptance with consumer payment information, the system may also include consumer loyalty point information, authorization from an issuer, authorization from the system, security or wallet server authorization, consumer authentication or single use account number information. The system may also develop a consumer transaction database or an offer evaluation database.

BRIEF DESCRIPTION OF DRAWINGS

The above-mentioned features and advantages of the present invention can be more clearly understood from the following detailed description considered in conjunction with the following drawings, in which like numerals represent like elements and in which:

FIG. 2 is a flow chart illustrating an exemplary method in accordance with the invention for facilitating interaction between a consumer and a merchant.

DETAILED DESCRIPTION

Figure 1:
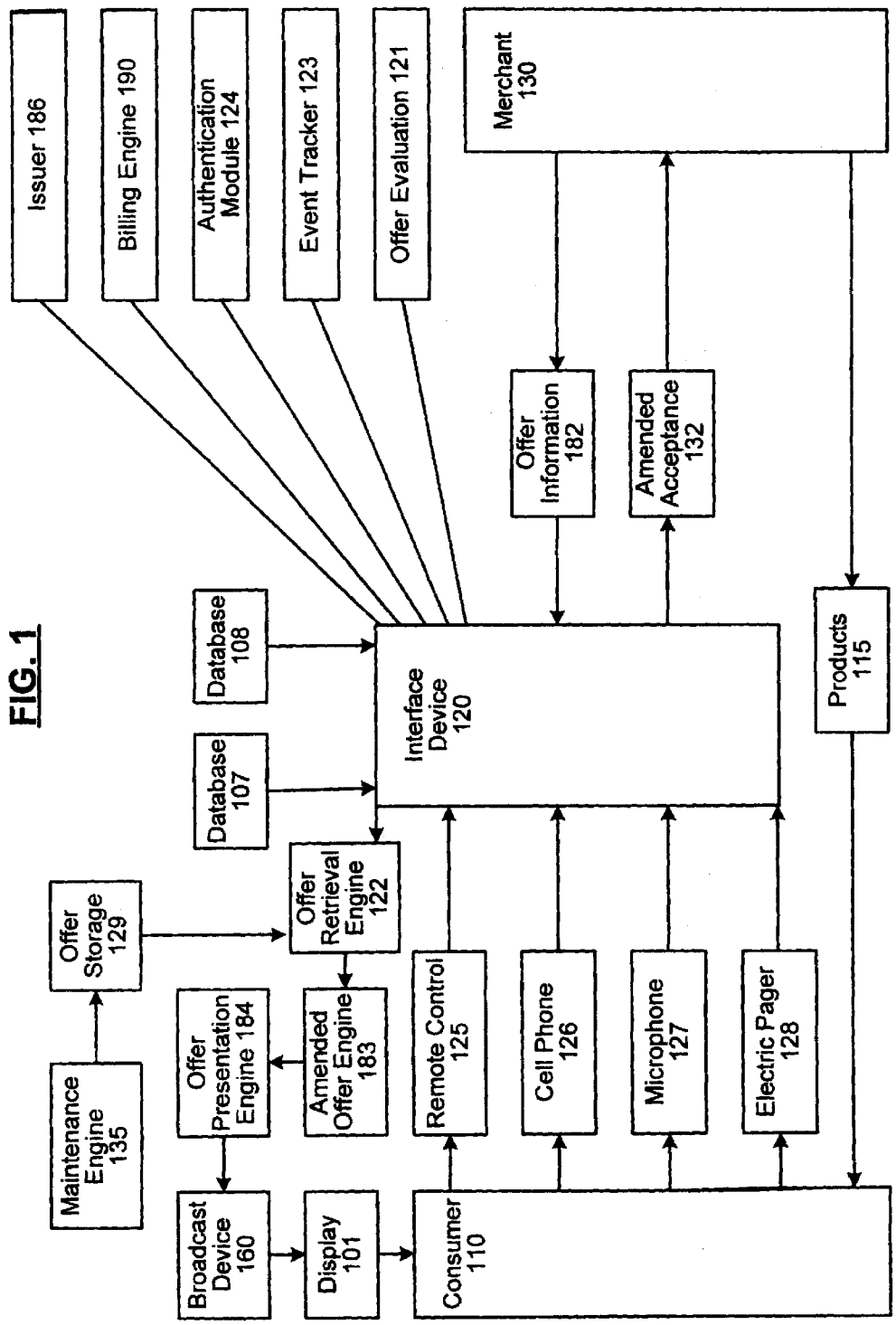
FIG. 1 illustrates an exemplary embodiment of a system in accordance with the invention for facilitating interaction between a consumer and a merchant.

The present invention facilitates interaction between a consumer 110 and a merchant 130. In an exemplary embodiment, the invention is illustrated with reference to presentation of advertisements and offers for products 115 provided by a merchant 130 to a consumer 110. In describing the invention, reference will be made to an interactive television system configured for facilitating interaction between a consumer 110 and a merchant 130, but the invention is not limited to this illustrative embodiment. For example, the interactive television system may include broadcasts via internet, email, cellular phone, personal digital assistant or any other broadcast which provides advertisement, information or offer information to the consumer 110. Merchant, as used herein, includes any one or more software, hardware, business, organization, consumer or any other entity that may sell, barter, promote, license, rent, distribute or participate in any process for transferring a product. Product 115, as used herein, includes one or more of a good, service, soft good (e.g., content, programming) or any other item. Consumer 110, as used herein, includes one or more of groups of consumers, individual, employee, employer, software, hardware, business, organization, merchant or any other entity. The invention, however, is not limited to such consumers or such merchants, nor is it limited to communications involving offers and advertisements. It is fully contemplated that the invention applies generally to facilitating any communications between a merchant 130 and a consumer 110. Further, wherever this description refers to the communication of information to a consumer, it is contemplated that the recipient of the information may be a system controlled by a consumer, a point of sale office, a global distribution system, a consumer, a party financially related to the consumer, or any other consumer of the system.

In an exemplary embodiment, the system, including the components shown in FIG. 1, may be configured as a data processing system that includes a processor for processing digital data, one or more memory coupled to the processor for storing digital data, means, coupled to the one or more memory, for inputting digital data, and a display 101 coupled to the processor and memory for displaying information derived from digital data processed by the processor. In one embodiment, an interface device 120 may be configured as an application program, may be stored in memory, and may be accessible by the processor for directing processing of digital data by the processor and the presentation of information via the display 101. In another embodiment, interface device may include a processor and a memory which stores an application program, wherein the application program may be accessible by the processor for directing processing of digital data by the processor. The interface device 120, databases 107, 108, display 101, broadcast device 160, or any other hardware or software of the present invention may be incorporated into an integrated circuit card, personal digital assistant, single computer, more than one computer with suitable interfaces or other similar devices. As those skilled in the art will appreciate, each computer may include an operating system (e.g., MICROSOFT WINDOWS NT, WINDOWS 95, WINDOWS 98, WINDOWS 2000, LINUX, SOLARIS, etc.) as well as various conventional support software and drivers typically associated with computers. The computers can be in a home or business environment with access to a network. In an exemplary embodiment, interface device 120 may be local hardware and/or software which may receive data from external sources or interface device 120 may be hardware and/or software remote from the consumer, but the interface device 120 may receive information from the consumer through any communication device or method discussed herein, including, for example, the Internet through a commercially-available web-browser software package.

As those skilled in the art will appreciate the memory and/or the processor may be configured as a smart card that may be employed in conjunction with the system to enable, enhance, and/or configure the system when installed and that may disable the system when removed. It should be appreciated that such a smart card may be employed by being physically inserted into and/or removed from the system or may be implemented remotely in a hard-wired box, a wireless remote control, or another complementary auxiliary device such as a hard-wired or wireless telephone.

In accordance with a preferred embodiment, the system 100 includes a first database 107 that may include identification, demographic, restriction, preference, shipping data, identity verification, authentication data and/or any other information relating to the consumer 110. In addition, a second database 108 includes payment information, (e.g., financial account information, loyalty information, etc) describing how the consumer 110 may wish to pay for transactions in accordance with the acceptance of one or more offer. The two databases 107, 108 can, of course, be combined as a single database or multiple databases including all of the above information. The databases, as used herein, may be incorporated into a smart card and/or the databases may also include external databases wherein similar or additional information may be acquired. Moreover, the databases discussed herein may be any type of database, such as relational, hierarchical, object-oriented, and/or the like. Common database products that may be used to implement the databases include DB2 by IBM (White Plains, N.Y.), any of the database products available from ORACLE CORPORATION (Redwood Shores, Calif.), MICROSOFT ACCESS or MSSQL by MICROSOFT CORPORATION (Redmond, Wash.), or any other database product. The database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Each consumer may be equipped with a computing system to facilitate communication, including presentations of advertisements, offers, and the like, between a merchant 130, an interface device 120, and a consumer 110. The consumer 110 may have a computing unit in the form of a personal computer, although other types of computing units may be used including laptops, notebooks, hand held computers, set-top boxes, and the like. The display 101 that is coupled to the computing unit may be configured to present television programming or web broadcasts 160, which may be received from a recording/playback device such as a digital video recorder (DVR), personal video recorder (PVR), VCR, DVD or any other similar device for transmitting signals and/or may be received through a broadcast transmission such as cable transmission, satellite transmission, UHF transmission, VHF transmission, WI-FI and the like. The point of sale office has a computing unit implemented in the form of a computer-server, although other implementations are possible. The merchant 130 may have a computing center in the form of a main frame computer. However, the merchant 130 may be implemented in other forms, such as a mini-computer, a PC server, a network set of computers, and the like.

The presentation of advertisements and/or offers and the facilitation of communication between the merchant 130 and the consumer 110 may necessitate additional communication among various third party institutions such as financial institutions and other providers of goods or services, e.g., shippers, payment escrow companies, and the like. The computers of the various parties may be interconnected via a second network, referred to as a transaction network. The transaction network represents existing proprietary networks that presently accommodate electronic communications and transactions. The transaction network may be a closed network that is assumed to be secure from eavesdroppers. Examples of the transaction network include the AMERICAN EXPRESS, VISANET and the VERIPHONE network.

Communication between the parties to the advertisement, offer, and acceptance transaction and the system 100 may be accomplished through any suitable communication means, such as, for example, a telephone network, Intranet, Internet, point of interaction device (point of sale device, personal digital assistant, cellular phone, kiosk, etc.), infrared remote control, hard-wired remote control, UHF remote control, online communications, off-line communications, wireless communications, WI-FI, digital video recorder (DVR), personal video recorder (PVR) and/or the like. One skilled in the art will also appreciate that, for security reasons, any databases, systems, or components of the present invention may consist of any combination of databases or components at a single location or at multiple locations, wherein each database or system includes any of various suitable security features (e.g., authenticating, embedded certificates, consumer ID/password, transmitted identifier, etc. as further described below), such as firewalls, access codes, encryption, de-encryption, compression, decompression, and/or the like.

The computing units may be connected with each other via a data communication network that may be a public network and that may be assumed to be insecure and open to eavesdroppers. In an exemplary embodiment, the network may be embodied as the internet. In this context, the computers may or may not be connected to the internet at all times. For instance, a consumer or point of sale computer may employ a modem to occasionally connect to the internet, whereas the interface computing center or the global reservation system computer might maintain a permanent connection to the internet. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997). Loshin, TCP/IP Clearly Explained (1997). All of these texts are hereby incorporated by reference.

The systems may be suitably coupled to the network via data links. A variety of conventional communications media and protocols may be used for data links. Such as, for example, a connection to an Internet Service Provider (ISP)

over the local loop as is typically used in connection with standard modem communication, cable modem, Dish networks, ISDN, Digital Subscriber Line (DSL), or various wireless communication methods. Consumer systems might also reside within a local area network (LAN) which interfaces to network via a leased line (T1, D3, etc.). Such communication methods are well known in the art, and are covered in a variety of standard texts. See, e.g., Gilbert Held, Understanding Data Communications (1996), hereby incorporated by reference.

The system and its functional elements may be implemented and distributed among the various parties. In an exemplary implementation, the transaction network may be implemented as computer software modules loaded onto the various computer systems of some of the parties (e.g., the point of sale office and the merchant), so that the computers of the other parties (e.g., the consumers) may not require any additional software to participate in the transactions supported by the transaction system.

The computers discussed herein may provide a suitable website or other Internet-based graphical consumer interface which is accessible by consumers. In one embodiment, MICROSOFT INTERNET INFORMATION SERVER, MICROSOFT TRANSACTION SERVER, and MICROSOFT SQL SERVER, are used in conjunction with the MICROSOFT operating system, MICROSOFT NT web server software, a MICROSOFT SQL database system, and a MICROSOFT COMMERCE SERVER. Additionally, components such as ACCESS or SQL SERVER, ORACLE, SYBASE, INFORMIX MYSQL, INTERBASE, etc., may be used to provide an ADO-compliant database management system. The term "webpage" as it is used herein is not meant to limit the type of documents and applications that might be used to interact with the consumer. For example, a typical website might include, in addition to standard HTML documents, various forms, JAVA applets, JAVASCRIPT, active server pages (ASP), common gateway interface scripts (CGI), extensible markup language (XML), dynamic HTML, cascading style sheets (CSS), helper applications, plug-ins, and the like.

An exemplary method 200 of the present invention is set forth in FIG. 2. The interaction process 200 may include a registration process (step 205). The registration process may require a consumer to complete an application through any process, such as, for example, input into on-line data fields, providing information to a telephone representative, completing a paper form and sending the form to the host and/or the like. The information may then be stored in databases 107 or 108 which may be accessed by interface device 120.

The registration process may request information about the consumer such as, for example, product preferences, payment information, payment preferences, contact preferences (e.g., time of day, medium, etc), restrictions on use of the system, restrictions on payment and/or the like. The registration process may also request any desired restrictions or limitations related to transaction types, products, merchants, accounts, consumers, preferences, changes to preferences, changes to registration or any other data, display of certain advertisements, acceptable fees (e.g., delivery, service charges, etc), shipping addresses, disclosing certain data, number of transactions, duration of use, and/or the like. These restrictions may be valuable to consumers that are, for example, parents who want to restrict minors' use of the system or employers who want to restrict employee use of the system.

The restrictions on use of the system may include different levels of access rights, wherein the employer may allow certain levels of employees to access or use certain features or functions of the system. For example, a lower level employee may have system access for viewing the advertisements, but a higher level employee must enter an approval code prior to ordering the desired product. In this regard, each consumer or groups of consumers may be assigned a particular code, identification (ID) or account number which, upon entry into the system, instructs the system about certain access rights or other customizations of the system. One skilled in the art will appreciate that any data or information related to the consumer may be used to customize the system. Moreover, the system may customize its operations by adapting the advertisement or amending the acceptance differently based on the specific consumer using the system. In this regard, for example, the system may require input of a certain consumer code or consumer ID such that only certain ads or groups of ads will be displayed to that particular consumer.

The present invention may also allow the consumer to select at least one authentication method for accessing the system or accessing certain features of the system. The system may allow a consumer to select a method of authentication for access to a restricted feature, where the restricted feature may require at least one of many methods of authentication in order to gain access to it. The system may register the consumer-selected method of authentication such that gaining access to the restricted feature requires the consumer to use the pre-selected method of authentication. In this way, the consumer may select the minimum level of security required for authentication in order to access the restricted feature. Alternatively, a host may select the minimum level of security required for authentication for accessing the restricted feature based on predetermined characteristics of the consumer. For more information related to determining authentication methods, see for example U.S. Ser. No. 10/035,064, filed on Dec. 27, 2001 and entitled METHOD AND APPARATUS FOR ENABLING A USER TO SELECT AN AUTHENTICATION METHOD, which is hereby incorporated by reference.

The present invention may also include a modular authentication means such that an authentication server module 124 is made available to facilitate authentication of consumers from various remote applications. In one embodiment, the consumer interfaces with an authentication server module 124 in order to properly transmit the authentication information. The authentication module 124 may grant the consumer various levels of access based on the authentication information. More specifically, interface device 120 receives a request to perform a task from a consumer. Interface device 120 forwards the request to module 124 that is configured to authenticate the consumer. The authentication module 124 substantially verifies the identity of the consumer, using one of a variety of different methods. The authentication module 124 may supply a session token indicative of the verification to interface device 120. Thereafter, the pre-determined permissions of the consumer are determined in one of a number of manners, such as accessing a database. After it is determined that the consumer has permission to perform the requested task (e.g., view offers or accept offer), the requested task may then be performed. The permissions may be stored in an access control list in database 107 that contains data regarding the identity and privileges of the consumer. For more information related to modular authentication and session management, see for example U.S. Ser. No. 10/334,615 filed on Dec. 31, 2002 and entitled METHOD AND SYSTEM FOR MODULAR AUTHENTICATION AND SESSION MANAGEMENT, which is hereby incorporated by reference.

In another embodiment, the invention may use an "identity provider" which may be part of the authentication module 124 to facilitate authentication services related to the interface device 120. The identity provider may also allow a consumer to be authenticated to different interface devices 120 in order to allow access to the different interface devices 120. Each identity provider may communicate with one or more interface device 120 such that a consumer that wishes to gain access to an interface device 120 is authenticated through the use of the identity provider. A method of the present invention involves a consumer accessing a first interface device 120 wherein the interface device 120 is configured to use an identity provider to authenticate the consumer to determine if the consumer is properly authorized to use the interface device 120. The identity provider analyzes the consumer and provides the authentication information to the interface device 120, which can then allow or deny the consumer access to the first interface device 120. Thereafter, when the consumer attempts to access a second interface device 120 that is associated with the same identity provider, the second interface device 120 accesses the identity provider and determines that the consumer was recently authenticated. The identity provider then sends the relevant information regarding the authentication process to the second interface device 120, which can then allow or deny the consumer access to the second interface device's 120 services. In the event that the level of authentication was not at a sufficient level, the second interface device 120 may allow the identity provider to authenticate the consumer with a higher degree of certainty. For more information related to exchanging authentication context information, see for example U.S. Ser. No. 10/334,270 filed on Dec. 31, 2002 and entitled METHOD AND SYSTEM FOR TRANSMITTING AUTHENTICATION CONTEXT INFORMATION, which is hereby incorporated by reference.

The registration process may also include registration of consumer identities. In this regard, the present invention may include a system and method for managing consumer identities. The system may include a registration component for the consumer identities, an ownership component, and an audit component. The registration component may be configured to register new consumers and establish a relationship between the consumer ID and the account or accounts related to the consumer ID. The ownership component may be configured to define the criteria used to verify the ownership of the account. The audit component may be configured to perform periodic checks to validate the relationships between an account and a consumer ID on a regular basis. A consumer may initiate a registration process using the registration component. If a customer needs help from customer service (for example, the consumer lost his password), such a process can be initiated via the registration component. An embodiment of the present invention may also be used in conjunction with pre-existing identity management services, which have access to pre-existing service profile data.

A method of the present invention for issuing identities associated with accounts may first receive a request for the creation of an identity. The request is processed by a component configured to determine the existing methods used to authenticate consumers. Thereafter, using various algorithms, questions are generated that can be used to verify the identity of the consumer. Answering the questions correctly is indicative of the fact that the consumer is who he says he is, therefore the identity can be issued. In addition, each transaction performed under the consumer identity may be aggregated. Positive weighting can be assigned to successful transactions that are indicative of ownership of the underlying account, while negative weighting can be assigned to unsuccessful transactions. Thereafter, the weightings can be analyzed to verify that the consumer identity is being used by the true owner of the underlying account. For more information related to managing consumer identities, see for example U.S. Ser. No. 10/334,271 filed on Dec. 31, 2002 and entitled METHOD AND SYSTEM FOR IMPLEMENTING AND MANAGING AN ENTERPRISE IDENTITY MANAGEMENT FOR DISTRIBUTED SECURITY, which is hereby incorporated by reference.

After completing the registration and initial authorization steps, the system may receive or obtain offer or advertisement information 182 from a merchant (step 210). Upon receipt of the offer information 182, the interface device 120 may retrieve consumer information from databases 107, 108 (e.g., consumer preferences, etc) (step 220). The consumer information may be useful in adapting the offer to substantially conform to the desires, tastes, preferences or other applicable attributes of the targeted consumer 110. The offer is then adapted in amended offer engine 183 (step 226).After adapting the offer (step 226), the adapted offer is transmitted via broadcast device 160 to a display 101 (e.g., television, computer screen, PDA screen, etc) to be presented to the consumer 110 using the offer presentation engine 184 (step 230). One skilled in the art will appreciate that Offer presentation engine may format or otherwise manipulate the amended offer prior to, during or after the amended offer is broadcast to the display 101.

More particularly, in one embodiment, the present invention facilitates the creation, storage, maintenance, identification, and retrieval, of incentive offers for presentation to consumers for the purpose of encouraging a desired set of one or more behaviors. The system may include an offer storage database 129 for storing offer in association with interface device 120, an offer retrieval engine 122 for finding and retrieving offers, and amended offer engine 183 for updating and maintaining the offers in offer storage database 129. The system cooperates with an offer presentation engine 184 for configuring and presenting offers based on consumer traits and the context in which the offer is to be presented. Each offer may comprise both an offer summary and offer details. The offer storage database 129 is configured to store an offer summary and a set of offer details for each stored offer. One skilled in the art will appreciate that the offers are not limited to storage in offer storage database 129; rather, other offers, offer information, or any portion thereof, may be retrieved from any other internal or external database or system.

In general, offer details may include who (e.g., the consumer) must perform what act (e.g., use or agree to purchase specific goods or services) within what time (e.g., during the offer period) and at what location (e.g., at a specified merchant) in order to receive the particular incentive. The system may include a maintenance engine 135 which may be adapted to respond to requests to create, modify, and delete offer summaries and offer details stored within the offer storage database 129. The maintenance engine 135 may also include a security mechanism (as set forth in step 238) adapted to authenticate a consumer before granting the consumer access to the repository. In accordance with an exemplary embodiment, a security mechanism is configured to limit access to a specific consumer or group of consumers, thereby enabling a maintenance engine 135 to safeguard the confidentiality of data within the repository and to prevent data from being disclosed in any unauthorized or undesirable manner. Finally, a retrieval engine 122 includes both a search tool and a retrieval tool and is configured to cooperate with an offer presentation engine 184 for configuring and presenting offers. Accordingly, retrieval engine 122 is adapted to send a request to the offer storage database 129, which may include additional search tools for the identification of an offer or set of offers. The search tool is configured to identify conforming offers, and the retrieval engine 122 is configured to retrieve the identified offer or set of offers. The system may be configured to facilitate the configuring and presenting of an offer to an consumer by the offer presentation engine 184.

The system may also be configured to consider the specific set of attributes of the consumer from consumer interactions with the system and/or information which may be retrieved from other sources or stored information about the consumer. The set of attributes may be used to substantially predict an optimum or desired combination of offer content and context based on the predicted aggregate effect of the content and context on the probability-discounted NPV. Predictions regarding the aggregate effects of multiple changes may be generated through methods such as root mean square, Bayesian modeling, and/or Monte Carlo simulation techniques. In addition, the system may be configured to formulate tests for the purpose of generating data (e.g., determining sensitivities) useful in evaluating one or more predetermined levers in specific controlled circumstances. For more information related to offer management, see for example U.S. Ser. No. 10/091,612 filed on Mar. 5, 2002 and entitled SYSTEM AND METHOD FOR INTEGRATING OFFERS, which is hereby incorporated by reference.

Once the consumer has viewed, analyzed and/or perceived the offer or advertisement, if the consumer wishes to accept the offer, the consumer may perform the specified act of acceptance (step 236) which may include, for example, selecting a simulated button on display 101, pressing a button or series of buttons on a remote control 125, placing a telephone call 126, speaking into a microphone 127, using a pager 128, using wireless device (e.g., WI-FI) or performing any other action or non-action which conveys the consumers desire to accept the offer. Moreover, the consumer may be provided with phone number dialing hardware and/or software which may be coupled to the interface device 120, thereby allowing the consumer initiate the automatic dialing of a desired phone number that is displayed in the advertisement and thereby facilitate communication with the interface device 120. The acceptance may also be accomplished (e.g., subsequent to the time of its broadcast) through a digital video recorder (DVR), personal video recorder (PVR) or similar device. The acceptance device may also include software and/or hardware configured to transmit or provide, for example, a remote control TD, RFID, machine IP address, web services (e.g., managing consumer identities as discussed above), etc. The consumer action may include a predefined action or non-action which indicates acceptance of the offer when the results of the act (e.g., transmitted signal) are received by the system (step 240). The acceptance may also include a security process (step 238) which may involve additional steps, or additional hardware and/or software.

For more information related to the RFID devices, see for example U.S. Ser. No. 10/192,488 filed on Jul. 9, 2002 and entitled SYSTEM AND METHOD FOR PAYMENT USING RADIO FREQUENCY IDENTIFICATION IN CONTACT AND CONTACTLESS TRANSACTIONS, which is hereby incorporated by reference. Web services are applications which are capable of interacting with other applications over a communications means, such as the internet. Web services are typically based on standards or protocols such as XML, SOAP, WSDL and UDDI. Web service methods are well known in the art, and are covered in many standard texts. See, e.g., Alex Nghiem, IT Web Services: A Roadmap for the Enterprise (2003), hereby incorporated herein by reference.

More particularly, with respect to the security process (step 238), the acceptance process may include any security framework known in the art or hereafter developed. For example, smart card authentication, embedded certificates, consumer ID and password, or other identifier transmitted through a communication device. The device used to perform the act of acceptance (e.g., smart card) may include a security engine which is used to provide suitable security measures with respect to the acceptance transaction. The security engine may utilize various authentication, data encryption, and digital signature techniques in connection with incoming and outgoing message packets. Suitable algorithms in the context of the present invention, may include, for example, DES encryption, RSA authentication, and a variety of other symmetrical and non-symmetrical cryptographic techniques. While a smart card embodiment shall be described herein, one skilled in the art will appreciate that the smart card embodiment may alternatively include any device capable of receiving digital information, for example, interface device 120, personal digital assistant, cell phone, DVR, etc.

The smartcard embodiment may include space and security features within specific applications which provide partnering organizations the ability to construct custom and secure file structures. For example, a smart card consumer ID application may include an authentication EF which comprises information for static authentication of the consumer ID application. This data may be unique for each card, and is sufficiently complex such that counterfeit values cannot feasibly be created. This prevents creation of "new" counterfeit cards (i.e., cards with new authentication data), but may not prevent creation of multiple copies of the current card. In a particular embodiment, authentication EF includes public key certificate fields, wherein the external format is identical to the internal format. In one embodiment, the issuer RSA key is 640 bits long, and the CA key is 768 bits long. For more information related to the secure file structures, see U.S. Pat. No. 6,101,477 issued on Aug. 8, 2000 and entitled METHODS AND APPARATUS FOR A TRAVEL-RELATED MULTI-FUNCTION SMARTCARD, which is hereby incorporated by reference.

Moreover, the smart card may also allow the downloading of information (e.g., advertisements, offers, database information 107, etc) onto a smart card via a trusted third party. In this embodiment, the present invention may include systems for authenticating, via cryptographic techniques, the download of information or applets onto the smart card via a trusted third party. An information owner (for example, the issuer of a smart card) may also delegate the information download to a third party. A digitally-computed acknowledgment of the download event may be produced using a digital "seal" or signature (depending upon the type of cryptographic algorithm used). The seal or signature may be a cryptogram generated by the information device using cryptographic keys resident on the information device itself. This acknowledgment is then made available to the information owner, who may then test the cryptogram to determine whether the download was successful. For more information related to the downloading of information onto a device capable of receiving digital information, see for example U.S. Ser. No. 09/522,628 filed on Mar. 10, 2000 and entitled METHODS AND APPARATUS FOR AUTHENTICATING THE DOWNLOAD OF APPLETS ONTO A SMARTCARD, which is hereby incorporated by reference.

Upon receipt of the offer acceptance information (step 240), the interface device 120 may combine the acceptance information with consumer identification information retrieved from database 107 and/or with consumer payment information retrieved from database 108 (step 244). One skilled in the art will appreciate that additional information may be obtained from any other internal, external or third party database for any desired analysis (e.g., authorization, promotions, loyalty points, etc) related to the transaction or for adding additional information to the received acceptance information. For example, interface device 120 may retrieve loyalty point information from an external database and include loyalty points as part of the payment. However, the present invention is not limited to merely exchanging loyalty points for product.

In an exemplary embodiment, consumers desiring to apply loyalty points to facilitate a particular transaction may use their charge card number or account number to facilitate a purchase, then the system, by interfacing with the relevant databases may associate the charge card account with a loyalty account. The system may then invoke a process to apply a currency value credit (corresponding to a defined amount of loyalty points) to the consumer's designated charge card account. This currency value credit may offset all or part of a corresponding purchase. Therefore, in this embodiment, loyalty points are not used to make the purchase, but may be used to offset at least part of a corresponding charge. The integration of the loyalty program and existing transaction (e.g., charge card) account processing systems may be generally transparent to the merchant in that the merchant may be unaware that the customer is using loyalty points by offsetting at least part of the charge with a corresponding credit. Additional embodiments may relate to the crediting of a variety of different accounts to facilitate particular transactions.

The present invention may or may not be integrated into a merchant or shopping network. The integrated embodiment of this invention may provide for an explicit and known relationship or interface between a merchant or group of merchants (i.e., shopping or redemption network or gateway) and an account manager (e.g., a loyalty program host system). The non-integrated loyalty embodiment, may allow the system to function independently of a merchant network, where the consumer may choose to redeem loyalty points for a currency equivalent credit without regard to a particular merchant, a network of merchants or a corresponding transaction. For example, a consumer possessing a card provider A's (or account manager's) charge card and participating in an affiliated loyalty program, may use loyalty points to facilitate a transaction with any merchant that accepts card provider A's charge card.

An exemplary system and method of the loyalty portion of the present invention may also be generally described herein in terms of a transaction phase, a transaction authorization and settlement phase, and an account reconciliation phase. During the transaction phase, a loyalty program consumer desiring to spend accumulated loyalty points generally selects products or services for purchase from an individual merchant or a shopping/redemption network of merchants. For example, during the act of acceptance (step 236), the consumer may select a "pay with loyalty points" button, thereby invoking a process to convert accumulated loyalty points to some currency value such as a credit to a consumer's financial transaction account. After selecting a given product or service to purchase, consumers may provide their transaction card number and the transaction is processed as with any other transaction. Additionally, in one embodiment, before the transaction is allowed to go forward, the interface device 120, by interfacing with certain relevant databases, may facilitate verification that sufficient credit is available on the consumer's financial transaction account and/or sufficient loyalty points are available in consumer's loyalty account. In this case, a charge authorization system is accessed to compare the transaction details with account information stored in the consumer's loyalty account and the consumer's transaction account.

During this verification process, the interface device 120 or a third party loyalty system middleware determines the appropriate number of loyalty points to use by implementing a conversion processor that converts the consumer's loyalty points to an appropriate currency equivalent (e.g., 100 loyalty points=$1 US). For example, taking into account the 100 to 1 conversation ratio, if the transaction amount is $100.00, the loyalty point equivalent would be 10,000 points. If the consumer confirms the use of designated loyalty points to complete the purchase, the consumer's loyalty account is reduced by the appropriate number of loyalty points and the merchant proceeds with the transaction authorization and settlement phase to complete the transaction.

It should be noted that the conversion ratio may vary from merchant to merchant according to the merchant's affiliation, if any, with the present invention or a related loyalty program. Through the interface device 120 or any third party loyalty system middleware conversion application, the system may adjust conversion ratios to take into account various promotional or incentive marketing programs in order to better serve the needs of its consumers or affiliated merchants. By further example, if a merchant or system manager desired to run a promotional program with a valued merchant, the conversion ratio for using loyalty points at the valued merchant (10 loyalty points=$1 US) may be twice the amount for that of an ordinary merchant (20 loyalty points=$1 US).

Additional exemplary embodiments relating to the transaction phase contemplate, inter alia, (1) use of a temporary account number ("secondary transaction number") instead of a physical transaction card number, (2) integration of a shopping or third party redemption network, (3) integration with external loyalty programs or commercial transaction networks, (4) redemption and conversion of loyalty points for gift products or charitable donations, (5) redemption and conversion of points without a corresponding purchase, e.g., for cash or statement credit, (6) transfer of loyalty points from one party to another, (7) transfer of loyalty points to different transaction instruments or consolidating points onto a single transaction instrument. For further information related to loyalty point systems, see for example U.S. Ser. No. 09/834,478 filed on Apr. 13, 2001 and entitled SYSTEM AND METHOD FOR USING LOYALTY POINTS; and U.S. Ser. No. 09/836,213 filed on Apr. 17, 2001 and entitled SYSTEM AND METHOD FOR NETWORKED LOYALTY PROGRAM, which are hereby incorporated by reference.

In addition to loyalty point information, one skilled in the art will appreciate that the amended acceptance 132 may also include the consumer identification information and the consumer payment information. With respect to the payment process, an issuer 186 may further amend the acceptance 132 to include additional payment information or instructions (step 246). While the system will be described with respect to an issuer, one skilled in the art will appreciate that any issuer, acquirer or any other relevant party may also amend the acceptance 132 to include additional payment information or instructions. In one embodiment, an issuer may incorporate financial account information or additional security features (e.g., single use account numbers, fraud limitations, privacy protections, additional authorizations, etc) into the amended acceptance 132 such that the merchant, upon receiving the amended acceptance, may obtain authorization, submission and settlement as is known in the art.

With respect to the single use account numbers, the consumer may be provided with a secondary transaction number that is associated with the consumer's primary account, (e.g., charge card), wherein the interface device 120 retrieves the secondary transaction number (the primary charge card number may not be retrieved) from database 108 or directly from issuer 186. After receiving the secondary transaction number, the merchant may process this secondary transaction number, similar to any other credit card number. Throughout this embodiment, the consumer's primary charge card number may never be passed to the merchant or any other third party. Additionally, the secondary transaction number may also carry with it certain limitations-on-use conditions, where the transaction is not authorized unless these conditions are met. In generating a secondary transaction number, upon a consumer's or interface device 120 request, in one embodiment, the issuer generates a random number and associates this number with the consumer's primary charge card account. This instantaneous and immediate generation of a random number allows for the number to be used by the consumer almost immediately upon receipt. This process obviates the need for separate activation of the secondary transaction number, and minimizes the possibility that a secondary transaction number, once issued, will not be utilized because the consumer or card provider failed to "activate" it.

During the authorization phase of the transaction process, the card provider receives the merchant's authorization request and verifies that certain limitations-on-use conditions, if any, have been satisfied. If the conditions have been satisfied, the request is approved and the card provider sends the merchant an approval code. If conditions have not been met, the request is declined. Although the request is declined, in an exemplary embodiment, the secondary transaction number may not be "deactivated," and, as a result, may still continue through the payment process. An exemplary settlement process of the present invention involves receiving a request from a merchant to be paid for a particular transaction and paying the merchant. As noted above, even a secondary transaction number that has not been authorized or that has been denied authorization by the card provider, may proceed through settlement, with the incumbent risk to the merchant that the transaction (if not accompanied by a valid approval code) may later be charged back to the merchant if the transaction is disputed. During the settlement process, the accounts payable system pays the merchant, referencing only the secondary transaction number. However, prior to the accounts receivable processing, the secondary transaction number is replaced with the primary account for consumer billing. The consumer's statement may reflect, as desired, the secondary transaction number(s), the primary account number(s), all numbers or any combination of these numbers. For further information related to single use account number systems and other security features, see for example U.S. Ser. No. 09/800,461 filed on Mar. 7, 2001 and entitled SYSTEM FOR FACILITATING A TRANSACTION, which is hereby incorporated by reference.

In another payment process embodiment, the issuer may authorize the consumer payment information against a central authorization system. The issuer may then submit the payment authorization to the merchant, thereby allowing the merchant to ship or deliver the goods immediately. This system is especially advantageous and efficient when dealing in soft goods such as content or programming.

In another payment process embodiment, instead of the merchant or issuer/acquirer billing the consumer, the system 100 may include suitable hardware and/or software in billing engine 190 to facilitate system 100 directly billing the consumer for the consumer purchases. Billing engine 190 may receive consumer acceptance information and product information, then billing engine 190 may obtain appropriate authorizations from databases internal to system 100 or from third party credit systems. Upon billing engine 190 obtaining a sufficient authorization related to the consumer's desired purchases, interface device 120 may notify the merchant that the charge is authorized, thereby allowing the merchant to ship the goods. The billing engine 190 then charges the consumer for the purchases and settles with the relevant merchants. This system may be advantageous because it allows the system host to better promote its own brand and it also may allow additional billing convenience if all of the charges are incorporated into the same billing statement as the pre-existing system billing.

The interface device 120 may then transmit the amended acceptance 132 (e.g., including loyalty point value) to the merchant 130 (step 250). Prior to transmitting the amended acceptance 132 to the merchant, the system and method may also include authenticating or authorizing the transaction. One skilled in the art will appreciate that the authentication or authorization steps discussed herein may be implemented during any suitable portion of the method discussed herein. In an exemplary embodiment of the invention, a consumer is provided with a smart card having a standardized protocol to make credit and debit transactions, such as, for example, the BLUE from AMERICAN EXPRESS smart card or the EUROPAY MASTERCARD VISA (EMV) smart card. The consumer utilizes the EMV Smartcard to interface with a wallet server to authenticate the consumer with a merchant server on a network through communications with a security server provided by a financial institution or credit provider such as, for example, AMERICAN EXPRESS. The consumer conducts a virtual purchase transaction using interface device 120 but via the internet through a wallet server interacting with the security server to provide enhanced reliability and confidence in the transaction.

The consumer logs onto the internet via a browser and selects a wallet, causing the establishment of a secure sockets layer link to the wallet server and, at about the same time, activates the consumer window. The wallet server requests the consumer to insert the smartcard for authentication to the server wallet account. With an encrypted identity certificate being set, the consumer then selects the credit provider/financial institution, such as AMERICAN EXPRESS, who will be providing guarantee of the payment, from the provider available in the wallet. The consumer then logs onto the merchant server, completes shopping, goes to the checkout screen and selects secure checkout. Again, the interfaces may be over a secure sockets layer. Next, the wallet server completes the form and transmits it to the merchant server, which uses an interface to a third party processor or directly to the security processor of the credit provider. The credit provider security processor uses the wallet interface to the consumer card to access smartcard functionality and generates a signed transaction. Alternatively, the connection can also be used to securely update functionality as required. The transaction card security processor authorizes the transaction on a "card present" basis. The merchant server then integrates the authorization with the wallet server completed form received from the wallet server and successfully completes the transaction, informing the consumer that the transaction has been successfully completed. For further information related to authenticating the transaction, see for example U.S. Ser. No. 09/754, 465 filed on Jan. 4, 2001 and entitled SMARTCARD INTERNET AUTHORIZATION SYSTEM, which is hereby incorporated by reference.

Thus, electronic transactions, such as purchase transactions, are conducted by receiving a transaction request from a consumer at a wallet server, issuing a challenge to the consumer from the wallet server, receiving a response from the consumer based upon the challenge, processing the response to verify the transaction instrument, assembling credentials (including authorization for the electronic transaction), and interfacing with a security server to authenticate the transaction. The system provides the benefits of substantially protecting the market and the credit provider from fraud, transaction non-imputation, an ability to modify parameters on-line, and providing the consumer with better service at a lower cost by reducing the costs to the merchant because the entire process is substantially transparent to the merchant.

Finally, once the merchant has received the amended acceptance 132 (step 260), the merchant may complete the transaction by dispatching the goods or services to the consumer (step 270) and reconciling the consumer's account (step 278) as is known in the art. As with traditional purchases using transaction cards, the transaction card details (e.g., transaction card number, expiration date, etc) are provided to the merchant or shopping network system to complete the transaction. The merchant may then process this transaction card number (and associated transaction details) for authorization and settlement as is generally done with routine transaction card purchases. The transaction authorization and settlement phase supports the processes of submitting a transaction record to the account manager (e.g., card provider or acquirer) for payment. A financial capture system captures the financial information and transaction details and sends this information to an accounts payable system to pay the merchant and to an accounts receivable system to update the consumer's transaction card account record to reflect the transaction event and applicable charge.

During the account reconciliation phase, if loyalty points are utilized, the accounts receivable system reconciles the charge for the particular transaction with a credit from the consumer's loyalty account. In one embodiment, for each charge where the consumer selected to pay with loyalty points, there will be a corresponding and offsetting charge to the account. In another embodiment, where the account consumer desires to pay only part of the transaction amount with loyalty points, the loyalty credit will only partially offset the merchant charge and the remainder will be paid with the consumer's transaction card. In a third embodiment, there may be a credit from a consumer's loyalty account without a corresponding transaction charge, such as is the case with a gift certificate embodiment, where the points are converted to a currency credit and issued in the form of a gift certificate; or stored on or downloaded to a stored value card or smart card.

In another embodiment, the system may conduct an on-line "card-present" transaction that authenticates the consumer and facilitates the secure exchange of consumer payment and delivery information between a merchant and a host system while reducing or eliminating the need for an online wallet and/or merchant profiling. In particular, a consumer desiring to conduct a transaction with a merchant over a computerized network is redirected to a host system, which issues a challenge string to the consumer. The consumer inserts a smart card into a smart card reader and enters an appropriate PIN. The challenge string is signed and transmitted with the digital certificate to the host system, where the consumer is authenticated. The host system next retrieves the consumer's transaction account information (e.g., credit card account) from a consumer database. The host system then generates a temporary transaction number and associates the temporary number with the consumer's transaction account. The temporary transaction number and other related payment and delivery information is then transmitted from the host system to the merchant via an authenticated communication channel. This authenticated communication channel may be established by several methods, including various cryptographic techniques. In an exemplary embodiment, the appropriate account information data (e.g., transaction number, etc.) and/or a token signature is embedded within a consumer's browser and transmitted from the host system to the merchant by redirecting the consumer's browser to the merchant site.

Once at the merchant site, the merchant decodes this token with a public key, thereby confirming the origination and authenticity of the account information data. In another exemplary embodiment, the merchant, upon receiving the temporary transaction number and data from the consumer's browser, queries the host system through a second communication channel to confirm the authenticity of the transaction data. Once the communication channel is confirmed, transaction data may be confidently transmitted from the host system to the merchant. Because an established line of communication is contemplated, the merchant payment and delivery fields are known and profiling (scraping or crawling) the website is not necessary. For further information related to facilitating a card present transaction over a distributed network, and improving the automation and security of online transactions by enhancing consumer authentication via an improved authentication process and more securely transmitting consumer transaction data between a host system and a merchant, see for example Ser. No. 09/943,658 filed on Aug. 30, 2001 and entitled ONLINE CARD PRESENT TRANSACTION, which is hereby incorporated by reference.

It should also be noted that the merchant may also develop a consumer, transaction/offer database (step 280) based on offers presented and/or accepted as well as consumer information acquired. In an exemplary embodiment, an event tracker is configured to track the content and/or context of presented offers as well as the demographic attributes of consumers and the results following offer presentation (e.g., which offers are accepted by the consumer). In an exemplary embodiment, an event tracker 123 within interface device 120 is configured to record consumer responses to presented offers (e.g., offer presentments, offer requests, requests for further information, and offer acceptance) and to accommodate delays between offer presentment and offer acceptance. An offer evaluator 121 is configured to determine the actual effects of changes in content of offers on NPV and likelihood of acceptance. Accordingly, offer evaluator 121 is configured to assess the effect of a change in the presentation context of one or more offers on likelihood of acceptance of the offers. In addition, offer evaluator 121 is configured to assess the effects of changes in offer content and/or offer presentment context on probability-discounted NPV. Finally, offer evaluator 121 is configured to correlate results of such assessments to identified consumer attributes (e.g., to group demographic profiles according to results). For more information related to facilitating the effective management of the formulation, storage, presentation, tracking and/or evaluation of offers for presentation to consumers for the purpose of encouraging a desired set of one or more behaviors, see for example U.S. Ser. No. 10/356,895 filed on Feb. 3, 2003 and entitled SYSTEM AND METHOD FOR ADMINISTERING INCENTIVE OFFERS, which is hereby incorporated by reference.

In these and other steps in accordance with the invention, a computer is identified as the operative instrument for carrying out the steps. In accordance with a preferred embodiment of the invention, all steps in the process are carried out on a centralized computer that has access to all of the relevant databases. Alternatively, the functions carried out by computer can be carried out by a plurality of local computers, preferably localized computers that are linked together.

Thus it is apparent that there has been provided, in accordance with the invention, a system and method that fully meet the needs specified above. Although the system and method have been described and illustrated with reference to specific illustrative embodiments, it is not intended that the invention be limited to these illustrative embodiments. Those skilled in the art will recognize that many variations and modifications to these illustrative embodiments are possible without departing from the spirit and scope of the appended claims. For example, as noted above, the databases that have been referred to can be individual databases, a single central database, or databases partitioned in ways other than as illustrated in the figures. Preferably the invention is practiced through use of a single central computer which can contain all transactions for a particular consumer, regardless of location of that consumer or various departments, divisions or other segments of that consumer.

While the network primarily discussed herein relates to an interactive television (ITV) network, it will be appreciated that many applications of the present invention could be formulated. One skilled in the art will appreciate that the network may include any system for exchanging data or transacting business, such as web broadcasts, the Internet, an intranet, an extranet, WAN, LAN, satellite communications, and/or the like. The consumers may interact with the system via any input device such as a keyboard, mouse, kiosk, personal digital assistant, handheld computer (e.g., PALM PILOT), cellular phone, integrated circuit card and/or the like. Similarly, the invention could be used in conjunction with any type of personal computer, network computer, workstation, minicomputer, mainframe, or the like running any operating system such as any version of WINDOWS, WINDOWS NT, WINDOWS 2000, WINDOWS 98, WINDOWS 95, MAC OS, OS/2, BEOS, LINUX, UNIX, SOLARIS or the like. Moreover, although the invention is frequently described herein as being implemented with TCP/IP communications protocols, it will be readily understood that the invention could also be implemented using IPX, APPLETALK, IP-6, NETBIOS, OSI or any number of existing or future protocols. Moreover, the system contemplates the use, sale or distribution of any goods, services or information over any network having similar functionality described herein.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention may be described herein in terms of functional block components, screen shots, optional selections, various processing steps, block diagrams and flowchart illustrations of methods, apparatus (e.g., systems), and computer program products according to various aspects of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. It will further be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The software elements of the present invention may be implemented with any programming or scripting language such as C, C++, JAVA, COBOL, assembler, PERL, VISUAL BASIC, SQL Stored Procedures, extensible markup language (XML), with the various algorithms being implemented with any combination of data structures, objects, processes, routines or other programming elements. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Further, it should be noted that the present invention may employ any number of conventional techniques for data transmission, signaling, data processing, network control, and the like. Still further, the invention could be used to detect or prevent security issues with a consumer-side scripting language, such as JAVASCRIPT, VBSCRIPT or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

In the foregoing specification, the invention has been described with reference to specific embodiments. However, it will be appreciated that various modifications and changes can be made without departing from the scope of the present invention. The specification and FIGS. are to be regarded in an illustrative manner, rather than a restrictive one, and all such modifications are intended to be included within the scope of present invention. For example, the steps recited in any of the method or process descriptions may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A method for facilitating interaction between a consumer and a merchant comprising the steps of:
   receiving, by an interface device, consumer preference information and restriction information associated with a consumer,
      wherein the consumer preference information is provided by at least one of the consumer, a parent of the consumer and an employer of the consumer, and
      wherein the restriction information is provided by at least one of the parent of the consumer and the employer of the consumer;
   storing the consumer preference information and the restriction information in at least one database associated with the consumer;
   receiving, by the interface device, offer information from the merchant via a broadcast that reaches a plurality of potential consumers, wherein the offer information relates to a product;
   receiving, by the interface device, consumer identification information associated with a card including card information corresponding to the consumer;
   retrieving, by the interface device, the consumer preference information and the restriction information from the at least one database based on the received consumer identification information;
   customizing, by the interface device, the offer information received from the merchant with prestored offer information retrieved from at least one database, to create an amended offer for the consumer, wherein the prestored information is selected according to the consumer preference information and the restriction information, and wherein the amended offer includes at least one specified method of acceptance determined by at least one of the consumer identification information and the restriction information;
   transmitting, from the interface device, the amended offer with the at least one specified method of acceptance to a display for viewing by the consumer;
   receiving, by the interface device, an acceptance of the amended offer from the consumer, wherein the acceptance is associated with the amended offer and the acceptance includes the card information;
   retrieving, by the interface device, consumer payment information from the database based on the received consumer identification information;
   amending, by an amended offer processor, the acceptance with the consumer payment information to create an amended acceptance upon receipt of the acceptance from the consumer by the interface device; and
   transmitting, by the interface device, the amended acceptance to the merchant.

2. The method of claim 1, wherein the step of transmitting the amended offer to a display includes transmitting via at least one of television programming and an Internet broadcast.

3. The method of claim 1, wherein the consumer preference information includes at least one of demographic information, identification information, and shipping information.

4. The method of claim 1, wherein the step of receiving an acceptance from the consumer includes receiving an acceptance via at least one of a remote control, an electronic pen, a telephone, an automatic dialing device, a microphone, a pager, a radio-frequency device, a personal digital assistant, a smart card, a digital video recorder (DVR), a personal video recorder (PVR), and a simulated button.

5. The method of claim 1, wherein a smart card information includes at least one of authentication information, an embedded certificate, a consumer ID and a password, an identifier, data-encryption information, a digital signature, a secure file structure, and a trusted third-party download.

6. The method of claim 1, wherein the consumer preference information, consumer payment information and consumer identification information are provided to at least one database in a registration process performed by the consumer.

7. The method of claim 1, further comprising the steps of:
   authenticating, by the interface device the consumer; and
   managing, by the interface device, consumer identities.

8. The method of claim 1, further comprising the step of analyzing, by the interface device, attributes of the consumer to substantially predict an optimal combination of offer content and context.

9. The method of claim 1, wherein the step of amending includes amending the acceptance with at least one of: consumer loyalty point information, an authorization from an issuer, an authorization from the interface device, a security or wallet server authorization, a consumer authentication, and single-use account number information.

10. The method of claim 1, further comprising the step of developing, by the interface device, at least one of a consumer transaction database, and an offer evaluation database.

11. The method of claim 1, wherein the step of transmitting the amended acceptance to the merchant includes at least one of authenticating the consumer, and authorizing a transaction between the consumer and the merchant.

12. A method according to claim 1, wherein the interface device includes the amended offer processor.

13. A system for facilitating interaction between a consumer and a merchant, the system comprising:
an interface device including:
at least one processor for processing digital data;
a memory coupled to said processor for storing digital data;
a device for accepting input of digital data; and
an application program stored in said memory and accessible by said processor for directing processing of digital data by said processor,
wherein said interface device is configured to perform the steps of:
receiving consumer preference information and restriction information associated with a consumer,
wherein the consumer preference information is provided by at least one of the consumer, a parent of the consumer and an employer of the consumer, and
wherein the restriction information is provided by at least one of the parent of the consumer and the employer of the consumer;
storing the consumer preference information and the restriction information in at least one database associated with the consumer;
receiving offer information from the merchant via a broadcast that reaches a plurality of potential consumers, wherein the offer information relates to a product;
receiving consumer identification information associated with a card including card information corresponding to the consumer;
retrieving the consumer preference information and the restriction information from the at least one database based on the received consumer identification information;
customizing the offer information received from the merchant with prestored offer information retrieved from at least one database to create an amended offer for the consumer according to the consumer preference information and the restriction information, and wherein the amended offer includes at least one specified method of acceptance determined by at least one of the consumer identification information and the restriction information;
transmitting the amended offer to a display for viewing by the consumer, wherein the amended offer specifies a method of acceptance;
receiving an acceptance of the amended offer from the consumer, wherein the acceptance is associated with the amended offer and the acceptance includes the card information;
retrieving consumer payment information from the database based on the received consumer identification information;
amending the acceptance with the consumer payment information to create an amended acceptance upon receipt of the acceptance from the consumer by the interface device; and
transmitting the amended acceptance to the merchant.

14. The system of claim 13, wherein the application program causes the processor to perform a step of authenticating the consumer.

15. The system of claim 13, wherein the application program causes the processor to perform a step of storing the offer information in an offer database.

16. The system of claim 13, wherein the application program causes the processor to perform steps of:
enabling consumers to perform a registration process to register consumer preference information; and
storing registered consumer preference information in the database.

17. The system of claim 13, wherein the application program causes the processor to perform a step of analyzing attributes of the consumer to substantially predict an optimal combination of offer content and context.

18. The system of claim 13, wherein the application program causes the processor to perform a step of amending the acceptance with at least one of consumer loyalty point information, an authorization from an issuer, an authorization from the interface device, a security or wallet server authorization, a consumer authentication, smart card information associated with the consumer, and single-use account number information.

19. A system according to claim 13, wherein the amending is performed by an amended offer processor in communication with the interface device.

20. A computer-readable medium having instructions stored therein, which when executed by a processor cause the processor to facilitate interaction between a consumer and a merchant by performing the steps of:
receiving, by an interface device, consumer preference information and restriction information associated with a consumer,
wherein the consumer preference information is provided by at least one of the consumer, a parent of the consumer and an employer of the consumer, and
wherein the restriction information is provided by at least one of the parent of the consumer and the employer of the consumer;
storing the consumer preference information and the restriction information in at least one database associated with the consumer;
receiving, by the interface device, offer information from the merchant via a broadcast that reaches a plurality of potential consumers, wherein the offer information relates to a product;
receiving, by the interface device, consumer identification information associated with a card including card information corresponding to the consumer;
retrieving, by the interface device, the consumer preference information and the restriction information from the at least one database based on the received consumer identification information;
customizing, by the interface device, the offer information received from the merchant with prestored offer information retrieved from at least one database, to create an amended offer for the consumer, wherein the prestored information is selected according to the consumer preference information and the restriction information, and wherein the amended offer includes at least one specified method of acceptance determined by at least one of the consumer identification information and the restriction information;
transmitting, from the interface device, the amended offer with the at least one specified method of acceptance to a display for viewing by the consumer;

receiving, by the interface device, an acceptance of the amended offer from the consumer, wherein the acceptance is associated with the amended offer and the acceptance includes the card information;

retrieving, by the interface device, consumer payment information from the database based on the received consumer identification information;

amending, by an amended offer processor, the acceptance with the consumer payment information to create an amended acceptance upon receipt of the acceptance from the consumer by the interface device; and transmitting, by the interface device, the amended acceptance to the merchant.

* * * * *

UNITED STATES PATENT AND TRADEMARK OFFICE
CERTIFICATE OF CORRECTION

PATENT NO. : 7,599,857 B2
APPLICATION NO. : 10/707309
DATED : October 6, 2009
INVENTOR(S) : Fred Bishop et al.

It is certified that error appears in the above-identified patent and that said Letters Patent is hereby corrected as shown below:

TITLE PAGE ITEM [56] REFERENCES CITED

"WO WO9720279 A1 *   6/1997" should be deleted.

COLUMN 1

Line 47, "good" should read --goods--.
Line 48, "regardless" should read --regardless of--.

COLUMN 2

Line 25, "to consumer" should read --for consumers in--.
Line 41, "good" should read --goods--.
Line 48, "on" should read --in--.

COLUMN 4

Line 39, "memory" should read --memories--.
Line 41, "memory," should read --memories,--.

COLUMN 5

Line 5, "appreciate" should read --appreciate,--.
Line 21, "etc)" should read --etc.)--.
Line 23, "offer." should read --offers.--.
Line 32, "DB2by" should read --DB2® by--.

COLUMN 7

Line 53, "etc)," should read --etc.),--.

COLUMN 8

Line 5, "groups" should read --group--.

CERTIFICATE OF CORRECTION (continued)
U.S. Pat. No. 7,599,857 B2

COLUMN 10

Line 16, "etc)" should read --etc.)--.
    Line 20, "226).After" should read --226). After--.
    Line 23, "etc)" should read --etc.)--.
    Line 25, "Offer" should read --offer--.

COLUMN 11

Line 40, "initiate" should read --to initiate--.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,599,857 B2 Page 1 of 1
APPLICATION NO. : 10/707309
DATED : October 6, 2009
INVENTOR(S) : Bishop et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 342 days.

Signed and Sealed this

Twenty-eighth Day of September, 2010

David J. Kappos
*Director of the United States Patent and Trademark Office*